United States Patent
Ossian et al.

(10) Patent No.: US 8,038,900 B2
(45) Date of Patent: Oct. 18, 2011

(54) PROCESS OF IMPROVING MELT VALUE OF MELTERS USING PROCESSED DESUGARIZED SOLUBLES (MDS)

(75) Inventors: Kenneth C. Ossian, Bettendorf, IA (US); Kelly Behrens, Davenport, IA (US)

(73) Assignees: Michael P. Ossian, Dewitt, IA (US); Derek R. Ossian, Bettendorf, IA (US)

( * ) Notice: Subject to any disclaimer, the term of this patent is extended or adjusted under 35 U.S.C. 154(b) by 69 days.

(21) Appl. No.: 12/633,026

(22) Filed: Dec. 8, 2009

(65) Prior Publication Data

US 2011/0133115 A1   Jun. 9, 2011

(51) Int. Cl.
*C09K 3/18* (2006.01)

(52) U.S. Cl. .......................................... 252/70; 106/13

(58) Field of Classification Search ............ 252/70; 106/13
See application file for complete search history.

(56) References Cited

U.S. PATENT DOCUMENTS

| | | |
|---|---|---|
| 5,683,619 A | 11/1997 | Ossian et al. |
| 6,080,330 A | 6/2000 | Bloomer |
| 6,149,834 A * | 11/2000 | Gall et al. ............ 252/70 |
| 6,299,793 B1 | 10/2001 | Hartley et al. |
| 6,398,979 B2 | 6/2002 | Koefod et al. |
| 6,416,684 B1 | 7/2002 | Bloomer |
| 6,436,310 B1 | 8/2002 | Hartley et al. |
| 6,440,325 B1 | 8/2002 | Hartley et al. |
| 6,582,622 B1 | 6/2003 | Hartley et al. |
| 6,596,188 B1 | 7/2003 | Hartley et al. |
| 6,599,440 B2 | 7/2003 | Hartley et al. |
| 6,605,121 B1 | 8/2003 | Roderick |
| 6,605,232 B1 | 8/2003 | Montgomery et al. |
| 6,641,753 B1 | 11/2003 | Bloomer |
| 6,770,217 B2 | 8/2004 | Hartley et al. |
| 6,800,217 B2 | 10/2004 | Koefod et al. |
| 6,805,811 B2 | 10/2004 | Hartley et al. |
| 6,827,873 B2 | 12/2004 | Hartley et al. |
| 6,905,631 B2 | 6/2005 | Hartley et al. |
| 7,014,789 B2 | 3/2006 | Hartley et al. |
| 7,122,127 B1 | 10/2006 | Ossian |
| 7,473,379 B2 | 1/2009 | Ossian et al. |

* cited by examiner

*Primary Examiner* — Anthony Green
(74) *Attorney, Agent, or Firm* — McKee, Voorhees & Sease, P.L.C.

(57) ABSTRACT

An improved processing of sugar beet molasses (MDS—Molasses Desugarized Solubles) with the addition of applied heat at about 140° F. to about 180° F. for a time sufficient to, along with alkali degradation, at any given concentration of MDS, show an increase in overall melt value performance when compared to non-use of the heat step.

8 Claims, 3 Drawing Sheets

PROCESS OF IMPROVING MELT VALUE OF MELTERS USING PROCESSED DESUGARIZED SOLUBLES (MDS)

FIELD OF THE INVENTION

This invention relates to de-icing and ice melting compositions for use in preventing or reducing ice and snow accumulation on surfaces. In particular, the invention relates to using applied heat on agricultural produced sugars, like from beets (Raffinate) during an alkali degradation process to increase ice melting values.

BACKGROUND OF THE INVENTION

De-icing compositions are widely used in northern areas of the country, particularly in northern climates subject to heavy ice and snow conditions in the winter months. One of the inventors of the present composition has numerous patents on ice melters. See, for example, U.S. Pat. No. 7,122,127, which relates to liquid ice melters, and U.S. Pat. No. 5,683,619 which relates to solid ice melting compositions which are environmentally friendly. The disclosure of these patents is incorporated herein by reference.

A good ice melter for roads, sidewalks, parking lots, etc. is inexpensive, easy to manufacture, effective in melting snow and ice and easy to apply. The best ones also provide reduced corrosion to application equipment while also having beneficial effects to vegetation. All of these advantages in one ice melter has been a goal of the ice melting industry for some time.

Effective in melting means a product capable of melting below zero degrees F. Ease of application is also important because labor cost is one of the largest components of melting snow and ice. Liquid ice melters bring ease to the application process.

In Ossian, Inc.'s earlier U.S. Pat. No. 5,683,619 (Ossian & Steinhauser), created a product that melted below zero and could have a positive effect on vegetation. The major disadvantage to this earlier invention was the high cost to produce the product and the cost of application. It used calcium chloride and urea in a dry melter composition. When calcium chloride is manufactured for industrial use it starts out as a liquid. The water is then evaporated to form a flake or pellet. This manufacturing process uses considerable energy adding cost of manufacture for the raw material. Some of this cost could be avoided if the ice melter were liquid as a finished product.

The solid ice melter of U.S. Pat. No. 5,683,619 is advantageous in that it is an effective melter, and it brings a positive effect on vegetation. It is in content a combination of urea and calcium chloride in a solid particle format. However, in recent times it has been of interest to develop liquid ice melters. In some environments, liquid ice melters are preferred to solid ice melters in that they give better coverage, they are much quicker acting melters, and they are more economical to prepare.

The liquid ice melter of U.S. Pat. No. 7,122,127 is a product that is less expensive to manufacture, easy to use, melts below zero and can have a positive effect on vegetation. In that invention, Ossian, Inc. used liquid calcium chloride solution combined with either dry or liquid urea, in critical ratios to achieve an effective liquid ice melter that is beneficial to vegetation.

Ossian, Inc.'s most recent U.S. Pat. No. 7,473,379 the two inventors (Ossian & Behrens) chemically degraded carbohydrates and protein in sugar beet molasses (desugared solubles) with alkali to a pH of at least 11 followed by an acid addition to lower pH to at least 10. These steps substantially and surprisingly increased melt value. The disclosure of this patent is incorporated herein, in its entirety, since the present case is an improvement on this process.

The industry has long looked for ways to either reduce or eliminate the use of salt for de-icing roadways, parking lots, sidewalks, etc. One of the more successful approaches of the past has been the use of prewetting and anti-icing. The present invention is suitable for this use.

Prewetting is the process of coating salt with different solutions as the salt is being applied to the roadway. These solutions are traditionally brines of sodium chloride, magnesium chloride and calcium chloride. In addition, various molasses agriculture by-products (e.g., Raffinate) are sometimes included with the solution. These by-products increase the viscosity of the prewet solution. The prewet process increases the melt value of the salt and reduces the bounce and scatter of dry salt when it hits the pavement. "Melt value" as used here refers to the ability to melt ice to brine at a given temperature, and it is measured by the volume of brine achieved within a specified amount of time.

Anti-icing is the process of placing the ice melter down in liquid form prior to any weather event. The concept being, it is easier to melt snow and ice from the bottom up as opposed to melting snow and ice from the top down. The concept uses less salt and is practiced by a number of State and Municipal governments. However, this method has its limits because common liquid ice melters such as solutions of calcium chloride, magnesium chloride, sodium chloride and potassium acetate all have relatively low viscosities causing run off problems. That is to say, these products do not stay in place but will instead easily penetrate into the concrete and will not have enough residual left on top of the pavement for very much melting action to occur. The problem is even more of an issue when liquid sodium chloride solution is used. The water in the solution will evaporate leaving a chalky salt residue that in some cases may dry up and blow away before a weather event even occurs.

To address this issue many have turned to a molasses type by-product derived from sugar beet (raffinate), sugar cane, corn sugars and steep water, brewers condensed solubles, distillers solubles, or mixtures thereof to increase viscosity. These by-products can provide value to the various solutions of calcium chloride, magnesium chloride, sodium chloride and potassium acetate by keeping them in place before, during and sometimes after the melting process. Adding these compositions to various solutions of ice melt chemicals helps keep them in place longer. See Patents: Bloomer U.S. Pat. Nos. 6,416,684; 6,641,753; 6,080,330; Hartley U.S. Pat. Nos. 6,299,793; 6,436,310; 6,440,325; 6,582,622; 6,596,188; 6,599,440; 6,770,217; 6,805,811; 6,827,873; 6,905,631; 7,014,789; Koefod U.S. Pat. Nos. 6,398,979; 6,800,217; Roderick U.S. Pat. No. 6,605,121.

However, all these patented products have a major limitation. The sugar by-products alone are very poor ice melters and their value potential is only to increase viscosity and act as a corrosion inhibitor. They, therefore, raise the overall costs and in most cases add little to no melting value to the liquid solution.

There has been some effort to improve the melt values of the sugar/molasses mixtures in U.S. Pat. No. 6,605,232. This patent degrades reducing sugars to a pH of 6.0 to 9.0 from steep water waste stream of agribusiness with an alkali. It requires a reducing sugar concentration of 10 to 70 parts by weight. This process is limited in availability of raw materials and in the increased melt value. In addition, it does not include the use of chloride salts. U.S. Pat. No. 6,080,330 uses raffinate but only to increase viscosity without providing any melt value enhancing pretreatment of the raffinate. Our earlier U.S. Pat. No. 7,743,379, uses treated raffinate to increase melt value. This present process improves upon U.S. Pat. No. 6,080,330.

It has now been found that by adding heat at elevated temperatures for a substantial length of time during the alkali degradation process for beet industry by-products, such as desugared sugar beet molasses, a significant melt value benefit can be achieved over our current U.S. Pat. No. 7,473,379.

A yet further benefit, can be achieve, by changing the alkali in our first U.S. Pat. No. 7,473,379 from the Group I metal sodium hydroxide to a different Group I metal, hydroxide, potassium hydroxide, one can achieve an even more significant melt value than just through use of adding heat processing during chemical degradation; in fact, this also allows production of a non-chloride ice melter for sensitive environmental areas that cannot tolerate chlorides, that still has excellent melt value properties.

BRIEF SUMMARY OF THE INVENTION

An improved processing of sugar beet by-products, such as molasses (MDS—Molasses Desugarized Solubles) (raffinate) with the addition of applied heat at about 140° F. to about 180° F. for a time sufficient to, along with alkali degradation, at any given concentration of MDS, show an increase in overall melt value performance when compared to non-use of the heat step.

DETAILED DESCRIPTION OF THE INVENTION

Figure 1:
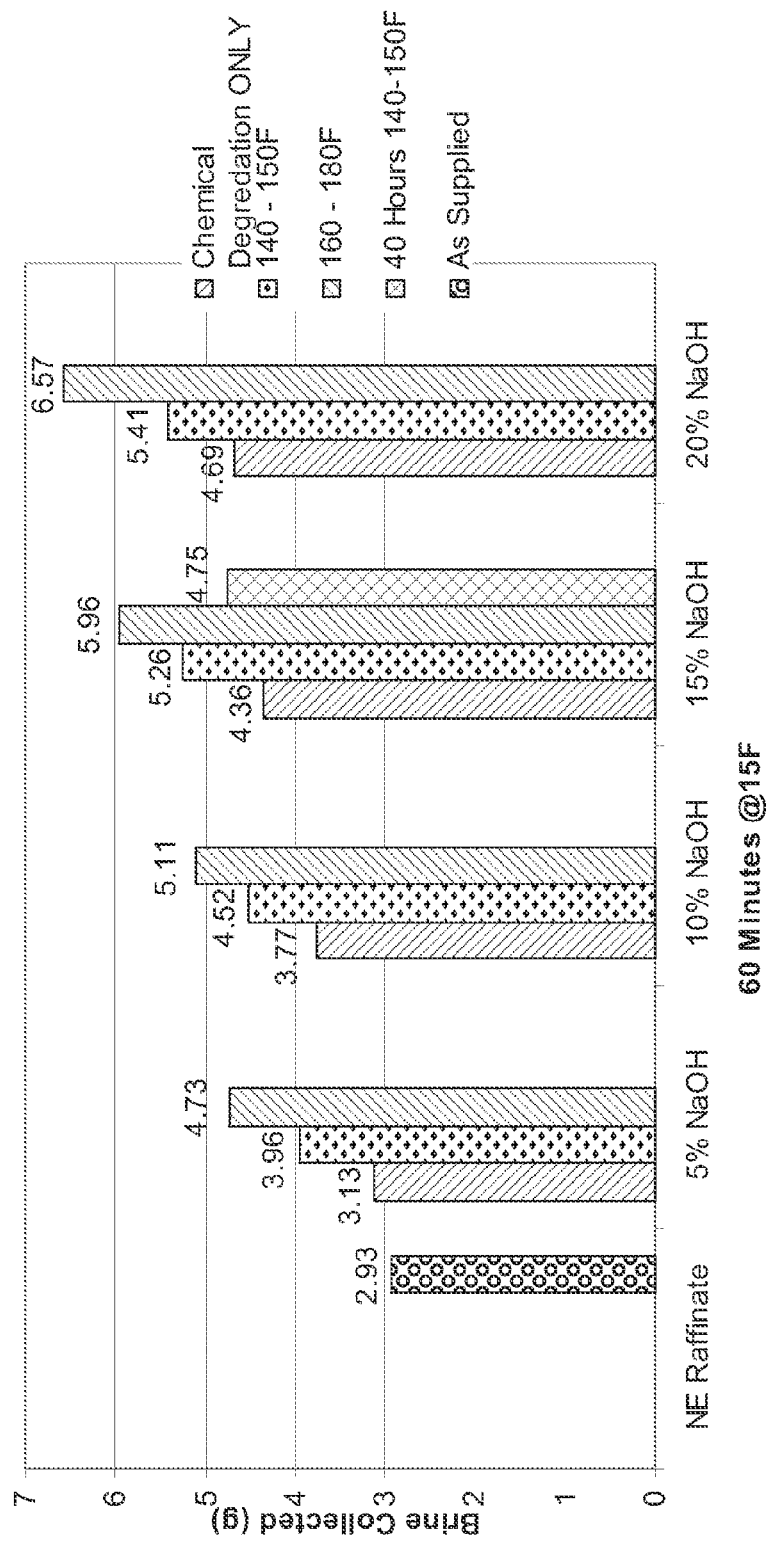
FIG. 1 shows the effect of separate heat treatment over time during the alkaline degradation process of MDS using sodium hydroxide.

The main objective of this invention is to increase melt value during the alkaline degradation of the desugared beet molasses with the addition of a separate and distinct applied heat step over a time sufficient to enhance melt value. The following lab tests were conducted to evaluate in-process heating of the desugared beet molasses during alkaline degradation.

Different sugar beet manufactures have different manufacturing procedures which may affect the results of use of our degradation process. For example these products are referred to as MBS (Molasses Beet Sugar) manufactured by Midwest Agri-Commodities at Renville, Minn.; MDS (Molasses Desugarized Solubles) manufactured by Western Sugar Cooperative at Scotts Bluff, Nebr.; CMS (Concentrated Molasses Solids) manufactured by Midwest Agri-Commodities at Bay City, Mich. These are all by-products of sugar beet processing plants and are a mixture of various sugars and proteins. The term sugar beet by-product solubles is used herein as generic to all of these products, similar to the way the term raffinate is used. These products are primarily sold as additives to the animal feed industry. All can be used in the process of this invention, but the preferred solids composition is MDS (Molasses Desugarized Solubles, often referred to as raffinate).

These various by-products will react differently during the alkaline degradation process, thus affecting their final melt value results. Market economics and available supply from different processing plants will effect product selection. For the majority of our melt comparisons we have elected to use one source for our desugared sugar beet molasses, Western Sugar Cooperative, Scottsbluff, Nebr. Testing of other molasses soluble products from other manufacturing plants have shown comparable or even slightly increased melt value results, which will be shown later. The specification on the MDS from Western Sugar Cooperative, Inc. follows for completeness of detail.

Molasses Desugarized Solubles (MDS) is produced during the exclusion separation of sucrose from beet molasses. In the process, sucrose is recovered for granulation and the greater part of the non-sugars of the original sugar beet molasses is separated into residual molasses and concentrated to produce MDS. Major components of MDS are: water, sugar, raffinose, betaine, amino acids, nitrogen compounds, inorganic salts and organic acid salts. These all occur naturally in sugar beets. MDS is a valuable animal feed additive that has many of the properties of molasses with more protein and minerals. It can also be used for molasses dried with beet pulp. MDS weighs approximately 80.8 pounds per cubic foot or 10.8 pounds per gallon. Its analysis is shown in Table 1.

TABLE 1

Nutritional Characteristics of MDS (Molasses Desugarized Solubles) Typical Analysis Ingredient Component

| Ingredient | Component |
| --- | --- |
| Dry Matter % (as fed) | 62% |
| Crude Protein | 18.3% |
| Total Sugars (as Invert) | 16% |
| Ash | 22% |
| Calcium | 0.13% |
| Potassium | 6% |
| Sodium | 3% |
| Sulfur | 1% |
| Ruminant TDN | 71% |
| Net Energy - Maintenance | .77 MCal/lb |
| Net Energy - Gain | 0.48 MCal/lb |
| pH | 7.7 |
| RDS | 62.M |

The following Examples are offered to illustrate but not limit the invention.

EXAMPLES

Using the MDS as shown above, in Table 1 comparison examples were made to show and demonstrate the effect of the preferred use of a separate and distinct heating step preferably at temperatures within the range of about 140° F. to about 180° F. for a time sufficient to degrade, but typically from about 10 to about 40 hours, preferably about 20 to about 40 hours.

Three sets of samples with different alkali percentages were tested at 5%, 10%, 15% and 20% and heated at two different temperature ranges for 20 hours. Set 1 involve no heat, set 2 involve heat at from 140° F. to 150° F. and set 3 involved heat at 160° F. to 180° F. Data for each of the samples and sets 1, 2 and 3 are provided below.

Samples in set 1 were chemically adjusted at the various percentage additions above using a 50% liquid concentration of NaOH. These samples were prepared using our original alkali degradation U.S. Pat. No. 7,473,379 as a base line for product improvement. Acetic Acid was used to bring back the samples down in pH to at least a pH of 10 or less.

SET #1

TABLE 2

(Set 1)

| SAMPLE | % NaOH | % AcOH | WPG | SG | Solids | pH | Melt Value |
|---|---|---|---|---|---|---|---|
| A | 5% | 6% | 11.11 | 1.33 | 63.44 | 6.55 | 3.13 |
| B | 10% | 8% | 11.11 | 1.33 | 62.23 | 6.89 | 3.77 |
| C | 15% | 10% | 11.14 | 1.34 | 63.00 | 8.22 | 4.36 |
| D | 20% | 12% | 11.11 | 1.33 | 63.11 | 8.18 | 4.69 |

WPG = weight per gallon
SG = specific gravity

Set #2: Heated 140-150° F.

Samples were chemically adjusted using a 50% liquid concentration of NaOH. Each sample was covered and heated to 140-150° F. for 20 hours. Acetic acid was added to lower pH after samples were cooled to room temperature.

TABLE 3

(Set 2, 140° F.-150° F.)

| SAMPLE | % NaOH | % AcOH | WPG | SG | Solids | pH | Melt Value |
|---|---|---|---|---|---|---|---|
| A | 5% | 3% | 11.28 | 1.35 | 73.26 | 9.73 | 3.96 |
| B | 10% | 4% | 11.26 | 1.35 | 70.5 | 9.83 | 4.52 |
| C | 15% | 8% | 11.21 | 1.35 | 68.80 | 9.39 | 5.26 |
| D | 20% | 12% | 11.10 | 1.33 | 66.31 | 7.86 | 5.41 |

Set #3: Heated 160-180° F.

TABLE 4

(Set 3, 160° F.-180° F.)

| SAMPLE | % NaOH | % AcOH | WPG | SG | Solids | pH | Melt Value |
|---|---|---|---|---|---|---|---|
| A | 5% | 1.5% | 11/64 | 1/40 | 74.46 | 9.22 | 4.73 |
| B | 10% | 3% | 11.60 | 1.39 | 68.54 | 9.26 | 5.11 |
| C | 15% | 4% | 11.68 | 1.40 | 69.62 | 9.73 | 5.96 |
| D | 20% | 7% | 11.67 | 1.40 | 68.58 | 7.46 | 6.57 |

Samples were chemically adjusted using a 50% liquid concentration of NaOH. Each sample was covered and heated to 160-180° F. for 20 hours. Acetic acid was added after samples were cooled to room temperature.

Each sample of each set was adjusted with acetic acid to acceptable pH levels of 10 or under. Each sample was evaluated for melt value by Strategic Highway Research Program (1992) SHRP H-205.2 Standard. Details concerning SHRP-H-205.2 are set forth in our earlier incorporated by reference U.S. Pat. No. 7,473,379.

The results in FIG. 1 and Tables 2, 3, and 4 indicate that as the alkali concentration increases along with increasing applied heat temperatures, the melt value improvement is exponential. The melt value for each alkali time heated sample is significantly improved over the non-heated samples (set #1) processed through chemical degradation only, as in our U.S. Pat. No. 7,473,379.

To test the amount of time for applying heat during the alkaline degradation the 15% NaOH in FIG. 1 was repeated for 40 hours at 140-150 F and melt value measured. The melt value was reported at 4.75 grams of brine collected which was substantially below the 20 hour measurement. This indicates that heating for a prolonged period (beyond 40 hours) may have a negative impact on melt value. At 40 hours there still is improvement, but not as much as at 20.

A popular non-chloride product of choice currently available in the ice melt industry is potassium acetate. This product is made by the reaction of potassium hydroxide and acetic acid with proprietary inhibitors added by the various manufacturers. In our process we can create a product with similar properties to potassium acetate but have a significant portion of the formulation be of a bio-based product. This provides a less expensive and safer product to manufacture.

A first step in this direction was to look at the melt value on non-heated raw material blends of MDS (Molasses Desugarized Solubles) and blends of potassium acetate. Four sample blends were made using 20%, 30%, 40% and 50% potassium acetate liquid blended with non-degraded MDS (Molasses Desugarized Solubles). Melt values were tested using SHRP H-205.1. The results would serve as our bench mark for comparisons with our heated samples during degradation with Potassium Hydroxide.

As previously mentioned with respect to the present invention, the improved process of treating MDS with a separate and distinct heating step especially when used with the preferred potassium hydroxide allows the creation of a product that can be used by itself as a non-chloride ice melter for sensitive environmental areas that cannot tolerate chlorides. This is another distinct advantage of the present invention. To further illustrate the advantages of using potassium hydroxide with acetic acid to generate potassium acetate that is used with a separate and distinct heating step of the present invention, the following examples were developed and run using SHRP H-205.2 melt values.

1. Add 1000 g of MDS (Molasses Desugarized Solubles)
2. Add KOH—45% liquid concentration
3. Heat for 20 Hours @ 160-180 F
4. Let Cool to room temperature
5. Add Acetic Acid to adjust PH. For this test the same amount of acetic acid was used as would be typical to manufacture Potassium Acetate as a stand alone product.

| Sample #A: MDS w/20% KOH and Acetic Acid | | |
|---|---|---|
| 1000 g of MDS | pH = | 7.02 |
| Added 130 g of KOH | Solids = | 77.48 |
| Cook overnight 20 hrs 160-180 F. | Brix = | 81.7 |
| Added 70 g of AcOH | SG = | 1.42 |
| Let cool | WPG = | 11.84 |
| Melt Value | Melt Value = | 5.38 |
| Viscosity | cP = | 434 cP 0.6 rpm @ 43.4% Torque |

| Sample #B: MDS w/30% KOH and Acetic Acid | | |
|---|---|---|
| 1000 g of MDS | pH = | 6.84 |
| Added 195 g of KOH | Solids = | 67.16 |
| Cook overnight 20 hrs 160-180 F. | Brix = | 72.7 |
| Added 105 g of AcOH | SG = | 1.37 |
| Let cool | WPG = | 11.37 |
| Melt Value | Melt Value = | 5.41 |
| Viscosity | cP = | 80.4 cP 4 rpm @ 52.7% Torque |

| Sample #C: MDS w/40% KOH and Acetic Acid | | |
| --- | --- | --- |
| 1000 g of MDS | pH = | 6.84 |
| Added 260 g of KOH | Solids = | 69.6 |
| Cook overnight 20 hrs 160-180 F. | Brix = | 73.1 |
| Added 140 g of AcOH | SG = | 1.37 |
| Let cool | WPG = | 11.39 |
| Melt Value | Melt Value = | 6.02 |
| Viscosity | cP = | 75.8 cP 4 rpm @ 49.3% Torque |

| Sample #D: MDS w/50% KOH and Acetic Acid | | |
| --- | --- | --- |
| 1000 g of MDS | pH = | 6.93 |
| Added 325 g of KOH | Solids = | 68.77 |
| Cook overnight 20 hrs 160-180 F. | Brix = | 72.1 |
| Added 175 g of AcOH | SG = | 1.36 |
| Let cool | WPG = | 11.35 |
| Melt Value | Melt Value = | 6.58 |
| Viscosity | cP = | 63.6 cP 4 rpm @ 40.9 Torque |

Figure 2:
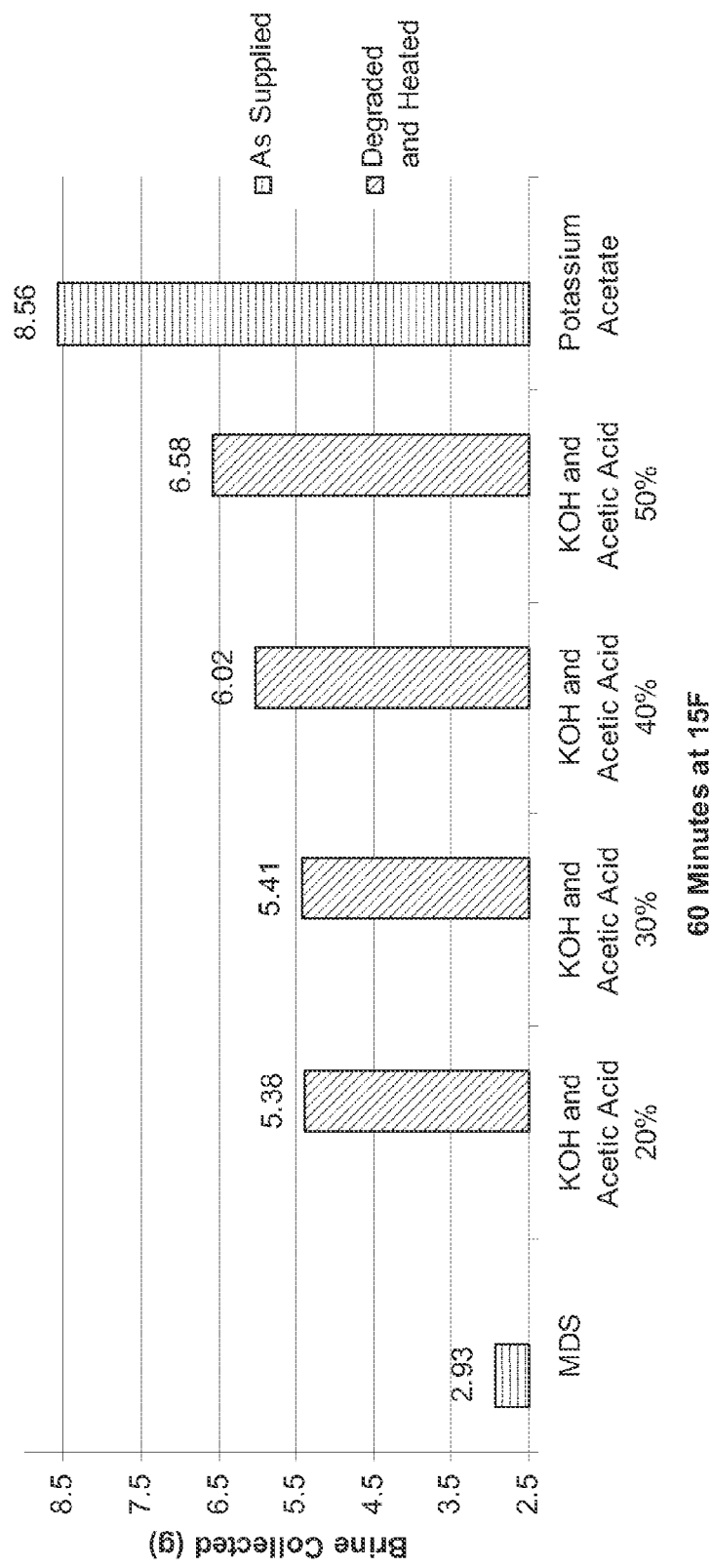
FIG. 2 shows the effects of an applied separate heat step over time using alkali degradation with potassium hydroxide.

The effect of applying heat over time using the alkali degradation with the preferred potassium hydroxide is as shown in FIG. 2. It can be seen in the data shown in FIG. 2 the melt values exceed both theoretical and actual melt values for MDS and potassium acetate blends.

As stated at the beginning of our patent application written description, the various sugar beet processing plants follow different manufacturing practices. This tends to lead to the product variances you can see in the physical properties of their by-products. Their by-products are similar in that they contain mixtures of various sugars and proteins that are a primary source of energy used as an additive in animal feed commodities.

In our discovery of applying a separate and distinct heat step for extended lengths of time during the alkali degradation process, we are able to increase the melt value on all the sugar beet by-products that we have listed in this application. MBS (Molasses Beet Sugar) Renville, Minn.; MDS (Molasses Desugarized Solubles) Scotts Bluff, Nebr.; CMS (Concentrated Molasses Solids) Bay City, Mich. MDS is however preferred.

The physical differences in the by-products supplied from the individual processing plants above are significantly different in melt value when evaluated side by side using Applicant's procedure. However, we can say for sure all are improved by our process. We would expect that the amount of inverted sugar(s) in the by-product can vary by several contributing factor(s): manufacturing processes, quality of each growing season, geographic growing locations, the time of year in which the beets are harvested and processed up to any weather climate variables.

While the objective of the sugar beet processing plants is to extract and convert as much sucrose (White Granulated Sugar) from each sugar beet root as possible, the by-product that is sold as desugarized molasses from this process is identified differently by each manufacturing/processing plant, but all are improved.

Figure 3:
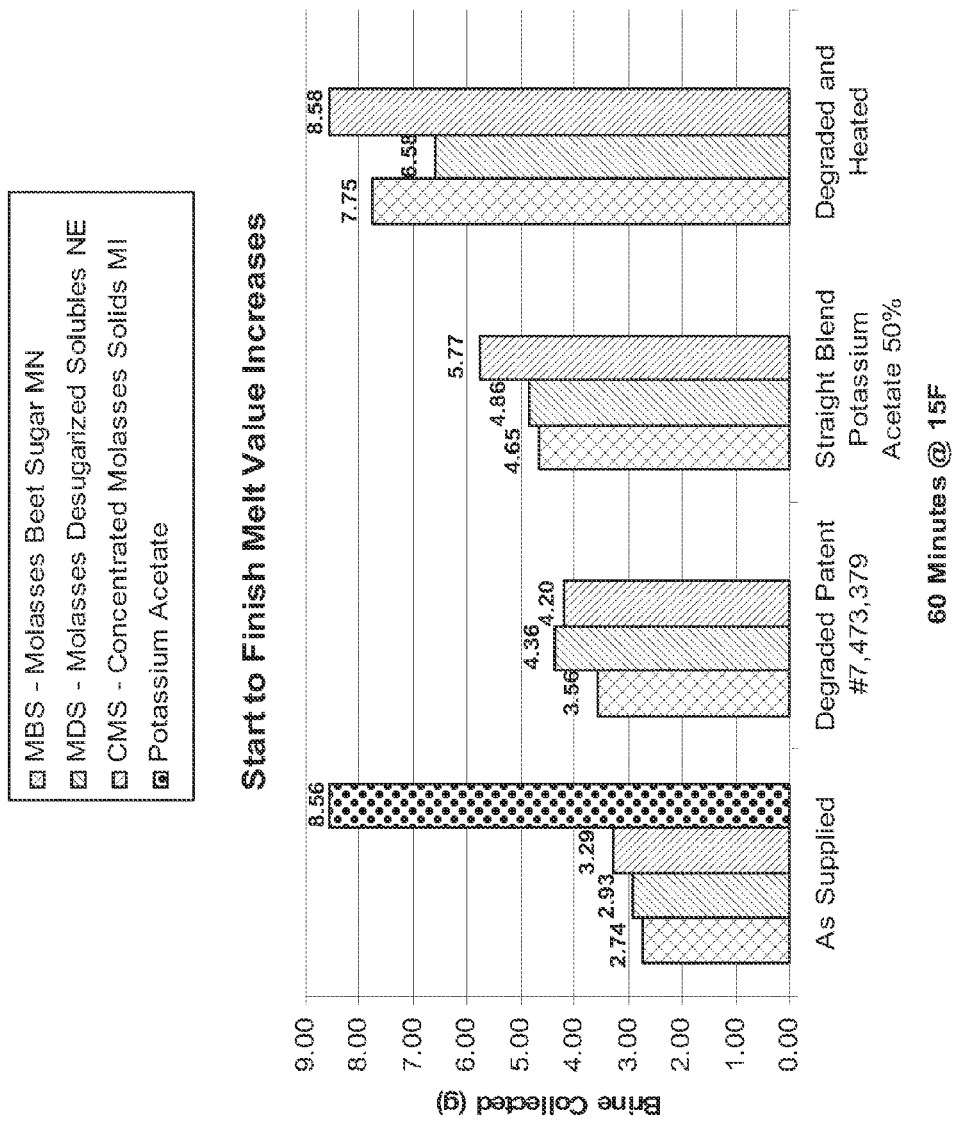
FIG. 3 shows a melt value comparison by various by-product raw materials as supplied versus chemically degraded MDS using U.S. Pat. No. 7,473,379 vs. Straight Raw Material Blends vs. Degraded and Heated blends using the improved process of the present invention with potassium hydroxide acetic acid.

FIG. 3 shows melt value comparisons on various by-product supplied versus chemically degraded processing using our earlier U.S. Pat. No. 7,473,379 and finally using heated blends using the new invention process with the preferred potassium hydroxide and acetic acid.

These results show that our invention yields a significant bio-based de-icer product which may contain no chlorides and yet provides exceptional melt value that is equal to or close to the melt value of straight potassium acetate.

What is claimed:

1. In a process of preparing a composition for both de-icing and inhibiting formation of ice and snow, that uses sugar beet by-product solubles which has been initially treated with alkali to increase its pH to at least 11, followed by holding for a time sufficient to degrade the sugar beet molasses and then is followed by acid addition to reduce the pH to 10 or less, the improvement comprising:
using a separate and distinct temperature heating and holding step throughout the addition of alkali to increase the pH at a temperature of from about 140° F. to about 180° F. for a time sufficient to enhance melt value, all occurring before the pH is lowered by acid addition.

2. The process of claim 1 wherein the sugar beet by-product solubles is selected from the group consisting of raw molasses beet sugar, molasses desugarized solubles, and concentrated molasses solids.

3. The process of claim 1 wherein the time sufficient is for from about 10 hours to about 40 hours.

4. The process of claim 3 wherein the time sufficient is from about 20 hours to about 40 hours.

5. The process of claim 1 wherein the heating and holding step is at a temperature of from about 140° F. to about 150° F.

6. The process of claim 1 wherein the heating and holding step is at a temperature of from about 160° F. to about 180° F.

7. The process of claim 1 wherein the treatment with alkali is with potassium hydroxide and the acid treatment which follows is with acetic acid.

8. The product of the process of claim 1.

\* \* \* \* \*